United States Patent
Elsey et al.

(10) Patent No.: US 11,714,450 B2
(45) Date of Patent: Aug. 1, 2023

(54) STYLUS HOLDERS

(71) Applicant: Hewlett-Packard Development Company, L.P., Spring, TX (US)

(72) Inventors: Andrew Shane Elsey, Spring, TX (US); Derek Kyle Joseph Kanas, Spring, TX (US); Kun-Chih Wang, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/419,750

(22) PCT Filed: Jul. 26, 2019

(86) PCT No.: PCT/US2019/043763
§ 371 (c)(1),
(2) Date: Jun. 30, 2021

(87) PCT Pub. No.: WO2021/021093
PCT Pub. Date: Feb. 4, 2021

(65) Prior Publication Data
US 2022/0147099 A1    May 12, 2022

(51) Int. Cl.
*G06F 3/0354* (2013.01)
*G06F 1/16* (2006.01)

(52) U.S. Cl.
CPC .......... *G06F 1/1607* (2013.01); *G06F 3/0354* (2013.01); *G06F 3/03545* (2013.01); *G06F 2200/1632* (2013.01)

(58) Field of Classification Search
None
See application file for complete search history.

(56) References Cited

U.S. PATENT DOCUMENTS

| 6,068,307 | A  | 5/2000 | Murphy |
| 9,971,379 | B2 | 5/2018 | Griffin et al. |
| 2007/0029360 | A1 | 2/2007 | Connelly et al. |

(Continued)

FOREIGN PATENT DOCUMENTS

| CN | 206584271 U | 10/2017 |
| KR | 10-2009-0129798 A | 12/2009 |

OTHER PUBLICATIONS

Google Offering a Free Pen Loop to Anyone who Bought the Pixelbook, May 22, 2019, 8 pages.
Pen Loop Light Blue, 1 page.

*Primary Examiner* — Xuyang Xia
(74) *Attorney, Agent, or Firm* — Knobbe, Martens, Olson & Bear, LLP

(57) ABSTRACT

Example stylus holders for an electronic device are disclosed herein. In an example, the stylus holder is coupled to an outer housing of the electronic device. In addition, the stylus holder includes a sleeve that is to transition between: an extended position, in which the sleeve is projected out of the aperture of the outer housing; and a retracted position, in which the sleeve is retracted into the aperture of the outer housing from the extended position. Further, the stylus holder includes a biasing member disposed within the outer housing and coupled to the sleeve. The biasing member is to bias the sleeve toward the retracted position when the sleeve is in the extended position.

15 Claims, 8 Drawing Sheets

(56) References Cited

U.S. PATENT DOCUMENTS

| | | | |
|---|---|---|---|
| 2011/0310065 A1* | 12/2011 | Liang | G06F 1/1626 |
| | | | 345/179 |
| 2012/0247989 A1 | 10/2012 | Cooper | |
| 2014/0029182 A1* | 1/2014 | Ashcraft | G06F 3/03545 |
| | | | 361/679.4 |
| 2014/0044470 A1 | 2/2014 | Jewson | |
| 2015/0277500 A1* | 10/2015 | Turowski | G06F 3/03545 |
| | | | 361/679.56 |
| 2020/0201396 A1* | 6/2020 | Meng | G06F 1/1607 |

* cited by examiner

STYLUS HOLDERS

BACKGROUND

Styluses are pen-shaped devices that may be used to provide inputs to an electronic device. Styluses are particularly useful for providing inputs to an electronic device that has a touch sensitive display or surface. During operations, a user may grasp the stylus (e.g., like a pen or other writing instrument) and maneuver the stylus to draw or write words, images, etc., on the touch sensitive display or surface such that they may be displayed in an electronic format by the electronic device (e.g., on a display).

BRIEF DESCRIPTION OF THE DRAWINGS

Various examples will be described below referring to the following figures.

DETAILED DESCRIPTION

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B." As used herein, the term "display" refers to an electronic display (e.g., a liquid crystal display (LCD), an organic light-emitting diode (OLED) display, a plasma display, etc.) that is to display images generated by an associated electronic device. The term "flexible display" refers to an electronic display that may be deformed (e.g., rolled, folded, etc.) within a given parameter or specification (e.g., a minimum radius of curvature) without losing electrical function or connectivity. As used herein, the term "electronic device," refers to a device that is to carry out machine readable instructions, and may include internal components, such as, processors, power sources, memory devices, etc. For example, an electronic device may include, among other things, a personal computer, a smart phone, a tablet computer, a laptop computer, a personal data assistant, etc.

As previously described, styluses are devices that may be used to form words or images on a touch sensitive display or surface of an electronic device. Because a stylus may be used infrequently and is relatively small (that is compared to the size of the electronic device that the stylus may be utilized with), these devices may be separated from the electronic device and ultimately lost. Accordingly, examples disclosed herein include stylus holders for an electronic device that are to provide a storage location along the electronic device for receiving and holding a stylus when not in use. In addition, the stylus holders disclosed herein may be extendable from an external surface of the electronic device such that the stylus holders may be partially or wholly retracted into the external surface of the electronic device when a stylus is not stored therein. As a result, the stylus holders may not change an overall aesthetic appearance of the electronic device when a stylus is not inserted therein.

Figure 2:
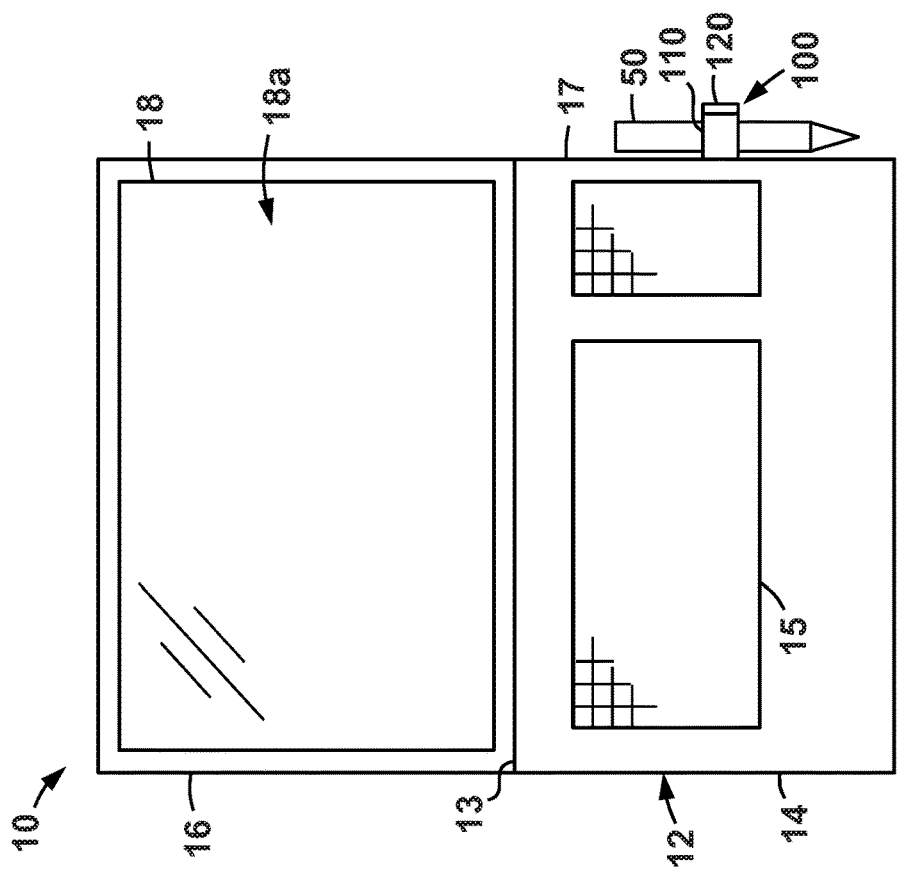
FIGS. 1 and 2 are schematic top views of an electronic device including a stylus holder according to some examples.
Figure 1:
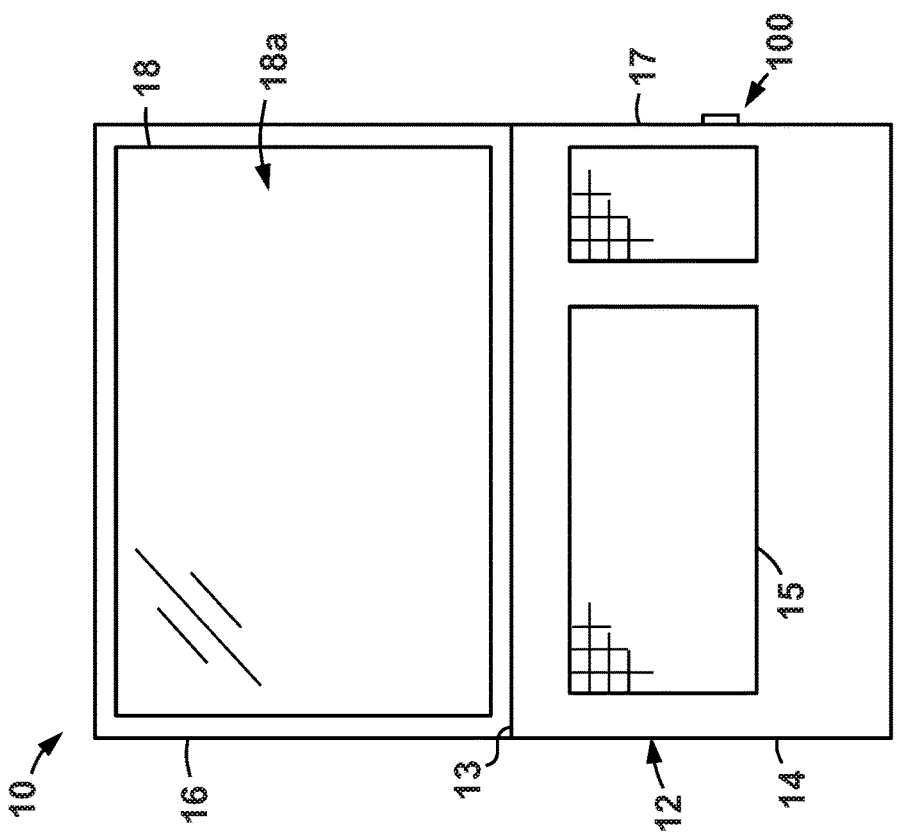

Referring now to FIGS. 1 and 2, an electronic device 10 according to some examples is shown. Electronic device 10 generally includes a housing 12 that is to hold and support the various components and features of electronic device 10. In this example, electronic device 10 is a laptop computer such that housing 12 includes a first housing member 14 rotatably coupled to a second housing member 16 at a hinge 13. The first housing member 14 includes a user input device 15, such as, for example, a keyboard, and/or a trackpad, etc. In the example of FIG. 1, the user input device 15 comprises a keyboard. The second housing member 16 includes an electronic display 18 (or more simply "display 18") that is to project images out of a front side or surface 18a for viewing by a user (not shown) of the electronic device 10. In some examples, display 18 may be a flexible display; however, display 18 may not be a flexible display in other examples.

In addition, in some examples, display 18 may be touch-sensitive, such that display 18 may detect inputs on electronic device 10 from physical contact with a user's finger or a stylus 50 during operations. Display 18 may utilize any suitable touch sensitive technology, such as, for instance, capacitive touch sensitivity, resistive touch sensitivity, surface acoustic wave touch sensitivity, etc. Accordingly, during operations, a user may engage display 18 with a finger, stylus 50, or some other device to affect changes on applications executed by electronic device 10.

Referring still to FIGS. 1 and 2, electronic device 10 also includes a stylus holder 100 coupled to the first housing member 14. Generally speaking, stylus holder 100 includes a sleeve 110 that is extendable from and retractable into the first housing member 14. When the sleeve 110 is extended from second housing member 16, stylus 50 may be inserted therein so as to secure stylus 50 to first housing member 14. During operations, a user may grasp an engagement member 120 coupled to the sleeve 110 to pull or extend the sleeve 110 from first housing member 14. In some examples, the engagement member 120 may project outward from an outer surface 17 of the first housing member 14 (e.g., such as is shown in FIGS. 1 and 2); however, in other examples, engagement member 120 may be flush, smooth, or even with the outer surface 17 of the first housing member 14. As will be described in more detail below, during operations, when the sleeve 110 of the stylus holder 100 is extended from first housing member 14, a biasing member (not shown) disposed within the first housing member 14 may apply a biasing force (e.g., biasing force $F_{150}$, $F_{250}$ described in more detail below) to bias the sleeve 110 into the first housing member 14.

As can be appreciated from FIGS. 1 and 2, in this example, the stylus holder 100 (particularly the sleeve 110) may be extendable from a side surface (e.g., the outer surface 17 previously described above) of the first housing member 14. However, it should be appreciated that in other examples, the stylus holder 100 may extend from a number of other surfaces of first housing member 14—such as, for instance, a top surface or another side surface (that is another side surface other than surface 17) of the first housing member 14. In addition, in other examples, the stylus holder 100 may extend from a surface of the second housing member 16.

Figure 3:
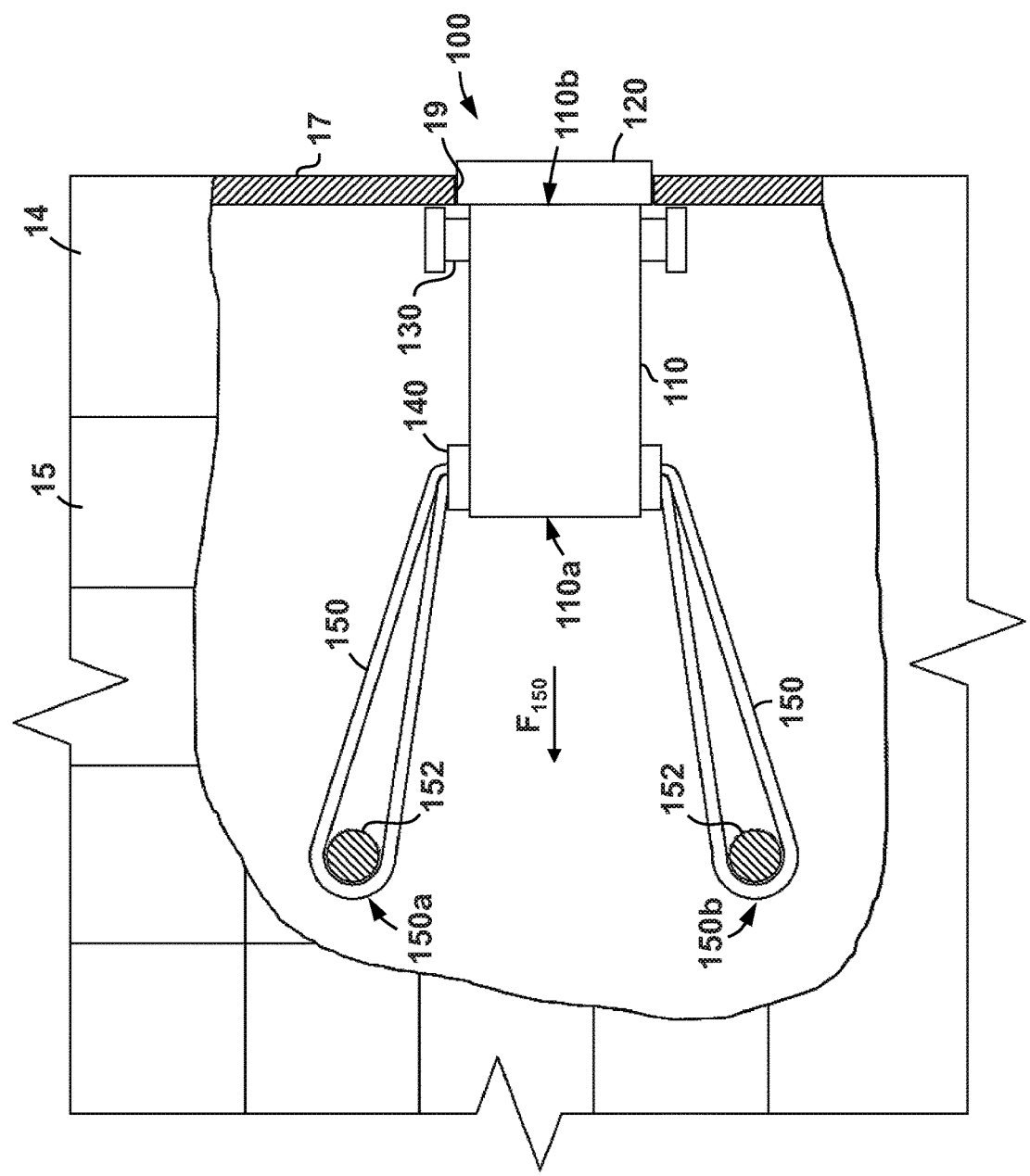
FIG. 3 is a top, partial cross-sectional view of a housing member of the electronic device of FIGS. 1 and 2, showing a stylus holder in a retracted position according to some examples.
Figure 4:
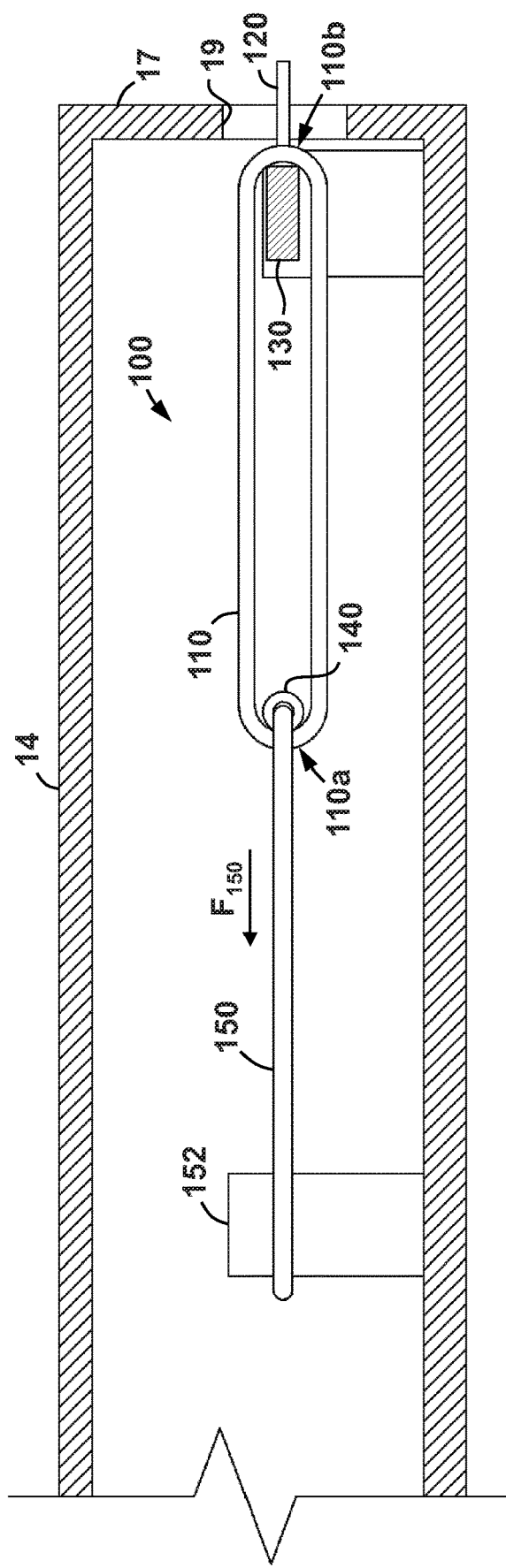
FIG. 4 is a side cross-sectional view of the housing member of the electronic device of FIGS. 1 and 2, showing the stylus holder of FIG. 3 in a retracted position according to some examples.

Referring now to FIGS. 3 and 4, stylus holder 100 is shown in more detail within first housing member 14. Sleeve 110 comprises a loop of material (e.g., fabric, textile, etc.) that includes a first or inner end 110a, and second or outer end 110b opposite inner end 110a. Engagement member 120 is secured to outer end 110b via adhesive, stitching, or any other suitable connection method. As previously described above, during operations, engagement member 120 and sleeve 110 are extendable from an aperture 19 in outer surface 17 of first housing member 14, so as to provide a storage location for a stylus (e.g., stylus 50 shown in FIGS. 1 and 2). In addition to sleeve 110 and engagement member 120, stylus holder 100 includes a guide 140, a stop 130, and a biasing member 150.

Biasing member 150 is coupled to sleeve 110 and may comprise any suitable member or mechanism for applying a biasing force to sleeve 110 during operations. For instance, in some examples, biasing member 150 may comprise a spring (e.g., coil spring, flat spring, torsion spring, etc.), a charged piston (e.g., a pneumatic piston), etc. In the example of FIGS. 3 and 4, biasing member 150 comprises a continuous band or loop of elastic material (e.g., rubber). As best shown in FIG. 3, the ends 150a, 150b of biasing member 150 are looped over suitable mounting members or structures 152 within first housing member 14, while a portion of biasing member 150, between ends 150a, 150b is extended through sleeve 110.

Guide 140 is an elongate member that is inserted within sleeve 110 such that guide 140 is disposed at inner end 110b. In this example, guide 140 is a tubular member; however, other shapes are contemplated. For instance, in some examples, guide 140 may comprise a partial pipe-section (e.g., half-pipe, quarter pipe, etc.) in some examples. In some examples, guide 140 may comprise an elongate member having a rectangular, D-shaped, circular, semi-circular, polygonal, etc., cross-section. In some examples, guide 140 may be engaged with or coupled to an outer surface of sleeve 110 rather than being inserted therein. For instance, in some examples, guide 140 may be a partial pipe-section that is adhered or secured to an outer surface of sleeve 110 at inner end 110a.

As shown in FIGS. 3 and 4, biasing member 150 is extended through guide 140 such that any biasing forces (e.g., biasing force $F_{150}$) from biasing member 150 are transferred to sleeve 110 via guide 140. The guide 140 may function to spread the biasing force from biasing member 150 over an entire width of the sleeve 110. As a result, the biasing member 150 may apply a generally evenly distributed force across the depth or width of sleeve 110 during operations. Without being limited to this or any other theory, by spreading the biasing force $F_{150}$ across a width of sleeve 110, folding, bunching, or creasing of sleeve 110 may be prevented or reduced. In some examples, biasing member 150 may be coupled to sleeve 110 and/or guide 140 via a hook or other similar mechanism (specifically, biasing member 150 may be secured to the end or ends of guide 140 in some examples) so as to allow biasing member 150 to transfer a biasing force (e.g., force F150) to sleeve 110 without being extended therethrough.

Referring still to FIGS. 3 and 4, stop 130 is an elongate member that is fixed within first housing member 14, proximate aperture 19. As best shown in FIG. 4, stop 130 extends through sleeve 110 so as to limit the extension and/or retraction of sleeve 110 from aperture 19 during operations. For instance, stop 130 may engage with outer end 110b of sleeve 110 when sleeve 110 is fully retracted within first housing member 14. In addition, as will be described in more detail below, stop 130 may engage with guide 140 (or inner end 110b of sleeve 110 if guide 140 is not included within stylus holder 100) when sleeve 110 is extended from aperture 19 to limit an extended position of sleeve 110 during operations.

Figure 5:
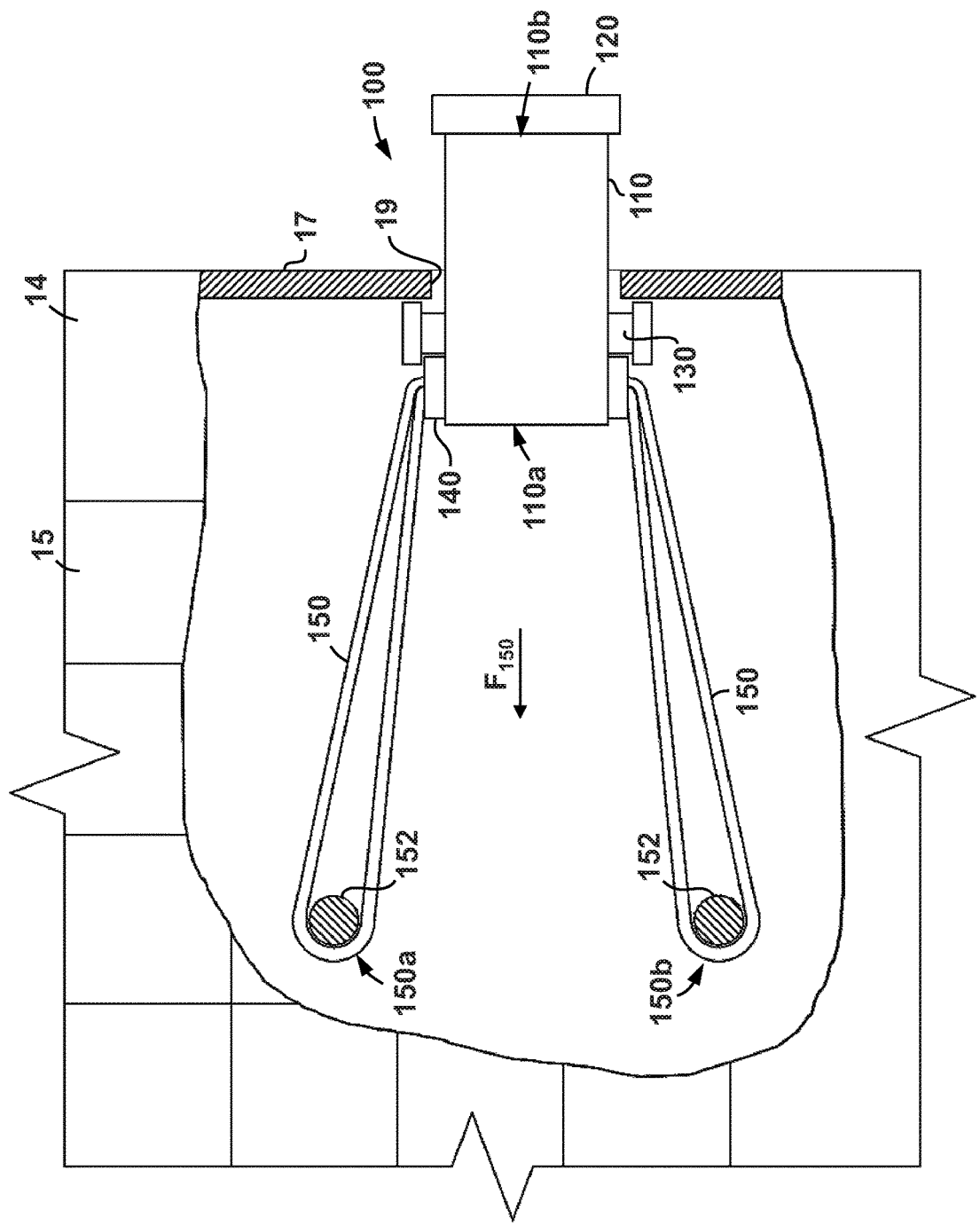
FIG. 5 is a top, partial cross-sectional view of the housing member of the electronic device of FIGS. 1 and 2, showing the stylus holder of FIG. 3 in an extended position according to some examples.
Figure 6:
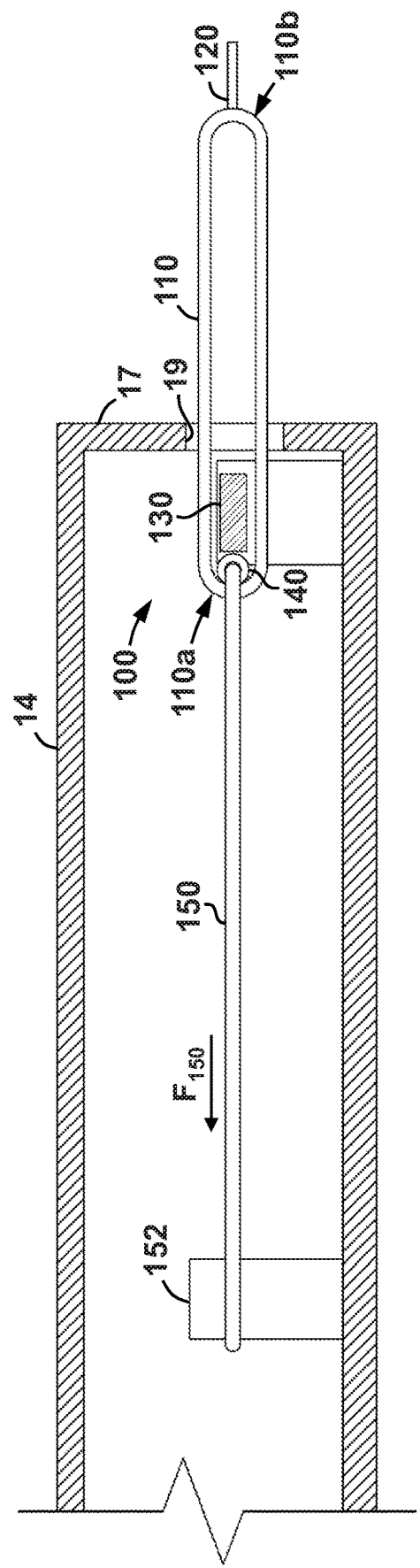
FIG. 6 is a side cross-sectional view of the housing member of the electronic device of FIGS. 1 and 2, showing the stylus holder of FIG. 3 in an extended position according to some examples.

Referring now to FIGS. 3 and 5, as generally described above, during operations, sleeve 110 may be transitioned between a first or retracted position such as shown in FIGS. 3 and 4, and a second or extended position such as shown in FIGS. 5 and 6. In the retracted position (FIGS. 3 and 4), sleeve 110 may be retracted (e.g., wholly or partially) within aperture 19 of first housing member 14. In some examples, outer end 110b of sleeve 110 may engage with stop 130, such as shown in FIG. 4, when sleeve 110 is in the retracted position. However, in other examples, sleeve 110 may not engage with stop 130 when in the retracted position. In addition, when sleeve 110 is in the retracted position (FIGS. 3 and 4), engagement member 120 may extend into and/or through aperture 19. For instance, in some examples, engagement member 120 may project out of aperture 19 and past outer surface 17 of first housing member 14. In other examples, engagement member 120 may be disposed within aperture 19 and recessed within outer surface 17 when sleeve 110 is in the retracted position. In still other examples, engagement member 120 may be flush or even with outer surface 17 when sleeve 110 is in the retracted position. Regardless of the precise positioning of engagement member 120, when sleeve 110 is in the retracted position, engagement member 120 may be grasped by a user so as to allow a user to pull the sleeve 110 from aperture 19. Thus, the size, positioning, and arrangement of the engagement member 120, aperture 19, and outer surface 17 may be set so as to facilitate and enable a user to grasp engagement member 120 during operations.

In some examples, biasing member 150 may apply a biasing force $F_{150}$ to sleeve 110 when sleeve 110 is in the retracted position. As shown in FIGS. 3 and 4, the biasing force $F_{150}$ may be applied to inner end 110a of sleeve 110 via guide 140 as previously described. The biasing force $F_{150}$ may maintain a minimum amount of tension on sleeve 110 when sleeve 110 is in the retracted position so as to prevent slack in the sleeve 110 during operations. However, in some examples, biasing member 150 may transfer little or no biasing force (e.g., biasing force $F_{150}$) to sleeve 110 when sleeve 110 is in the retracted position of FIGS. 3 and 4.

In the extended position (FIGS. 5 and 6), sleeve 110 is extended from aperture 19 until guide 140 engages with stop 130. Thus, stop 130 may define the outermost extended position of sleeve 110 from aperture 19 during operations. As the sleeve 110 is extended from aperture 19, biasing member 150 is stretched within first housing member 14, such that biasing force $F_{150}$ generally increases. Thus, biasing force $F_{150}$ may be at its maximum when sleeve 110 is in the fully extended position of FIGS. 5 and 6 (wherein guide 140 is engaged with stop 130 as described above). As a result, stop 130 may prevent an over-extension of biasing member 150, so as to prevent failure thereof during operations.

To transition the sleeve 110 from the retracted position (FIGS. 3 and 4) to the extended position (FIGS. 5 and 6), a user may grasp engagement member 120 and then pull sleeve 110 out from aperture 19 until guide 140 engages with stop 130 (see e.g., FIGS. 5 and 6). The user may not fully extend sleeve 110 until guide 140 engages with stop 130, and may pull sleeve 110 to a position that is less than the fully extended position of FIGS. 5 and 6. The user may then maintain the sleeve 110 in the extended position by continuing to grasp the engagement member 120 and applying a sufficient force thereto. Once in the extended position (e.g., the fully extended position of FIGS. 5 and 6 or an extended position that is less than the fully extended position), a user may simply release of the engagement member 120 such that the biasing force $F_{150}$ may urge sleeve 110 into the aperture 19 toward the retracted position of FIGS. 3 and 4.

Figure 7:
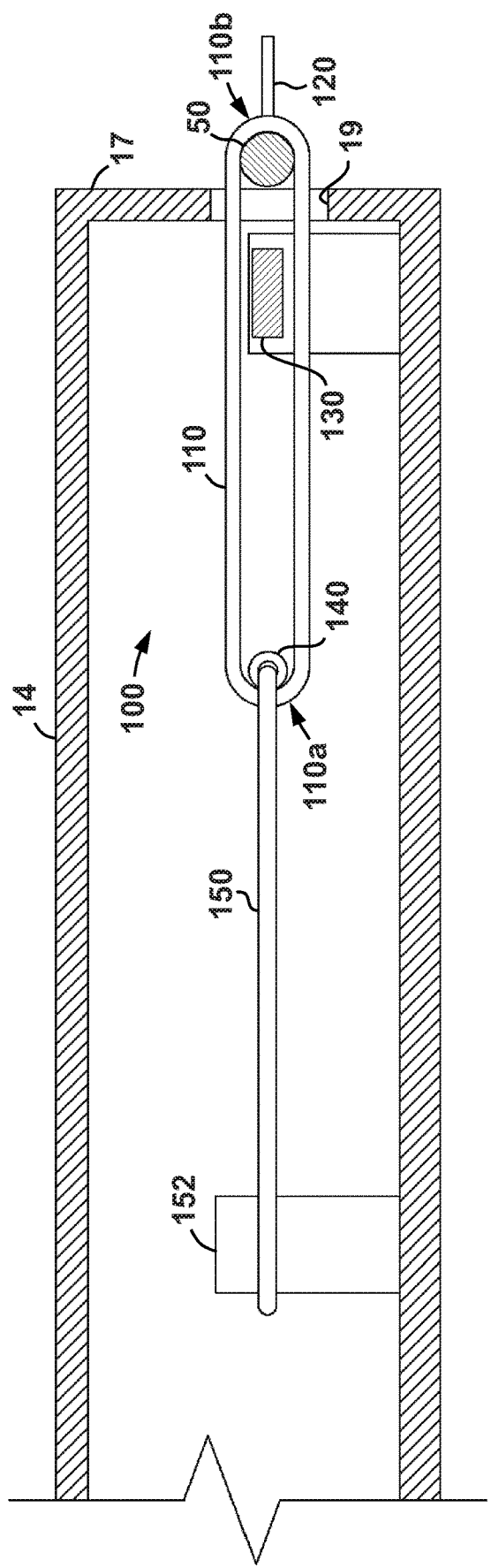
FIG. 7 is a side cross-sectional view of the housing member of the electronic device of FIGS. 1 and 2, showing a stylus secured against an outer surface of the housing member with the stylus holder of FIG. 3.

Referring now to FIGS. 2 and 7, when the sleeve 110 is in the extended position (e.g., either the fully extended position of FIGS. 6 and 7 or an extended position that is less than the fully extended position), a user may insert stylus 50 therethrough. Thereafter, the user may release engagement member 120 such that sleeve 110 may retract within aperture 19 via the biasing force $F_{150}$ as previously described above. However, when stylus 50 is inserted within sleeve 110, sleeve 110 is prevented from fully retracting within aperture 19 to the retracted position (e.g., FIGS. 3 and 4). Rather, the biasing force $F_{150}$ is transferred to stylus 50 via sleeve 110 so as to urge or pull stylus 50 against outer surface 17 of first housing member 14. Accordingly, the biasing force $F_{150}$ may secure stylus 50 along outer surface 17 so as to prevent unintentional withdrawal of stylus 50 from sleeve 110 during operations.

Figure 8:
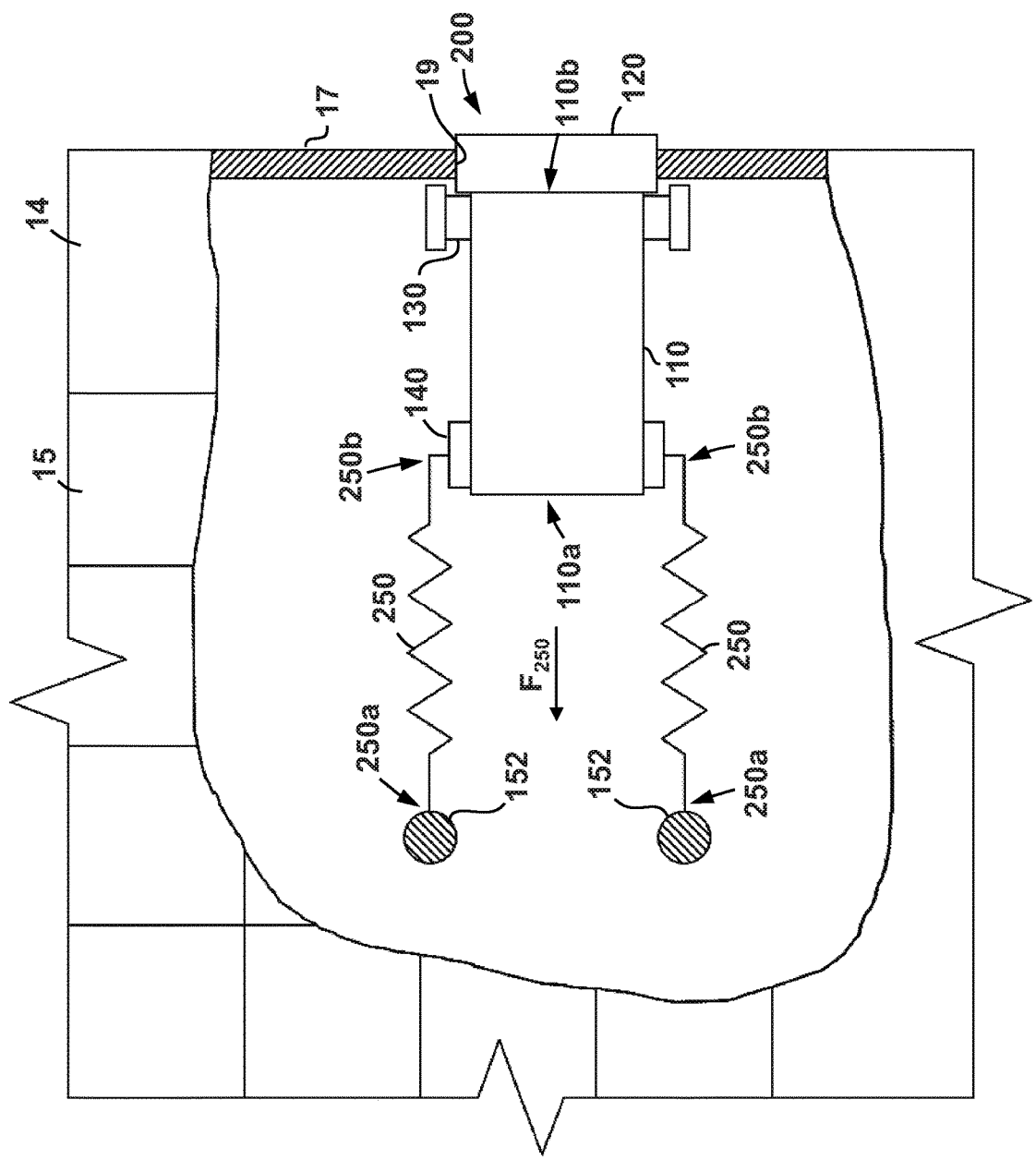
FIG. 8 is a top partial cross-sectional view of the housing member of the electronic device of FIGS. 1 and 2, showing a stylus holder in a retracted position according to some examples.

Referring now to FIG. 8, a stylus holder 200 for securing a stylus to electronic device 10 (see e.g., stylus 50 and electronic device 10 in FIG. 2) is shown. Stylus holder 200 shares many of the features of stylus holder 100, previously described. Thus, the features of stylus holder 200 that are shared with stylus holder 100 are identified in FIG. 8 with the same reference numerals, and the discussion below will focus on the features of stylus holder 200 that are different from stylus holder 100. Specifically, in place of biasing member 150, stylus holder 200 includes a pair of biasing members 250. Biasing members 250 comprise coiled springs that include first ends 250a that are coupled to support structure 152, second ends 250b that are coupled to guide 140. Together, biasing members 250 apply a biasing force $F_{250}$ to sleeve 110 that may bias sleeve 110 to a retracted position in the manner described above for biasing member 150 of stylus holder 100 (see e.g., FIGS. 3-6). In some examples, the pair of biasing members 250 may be replaced with a single biasing member 250.

During operations, a user may extend sleeve 110 of stylus holder 200 and insert a stylus (e.g., stylus 50) therein in the manner described above for stylus holder 100. Thus, a detailed description of these operations is not repeated herein in the interests of brevity.

Figure 9:
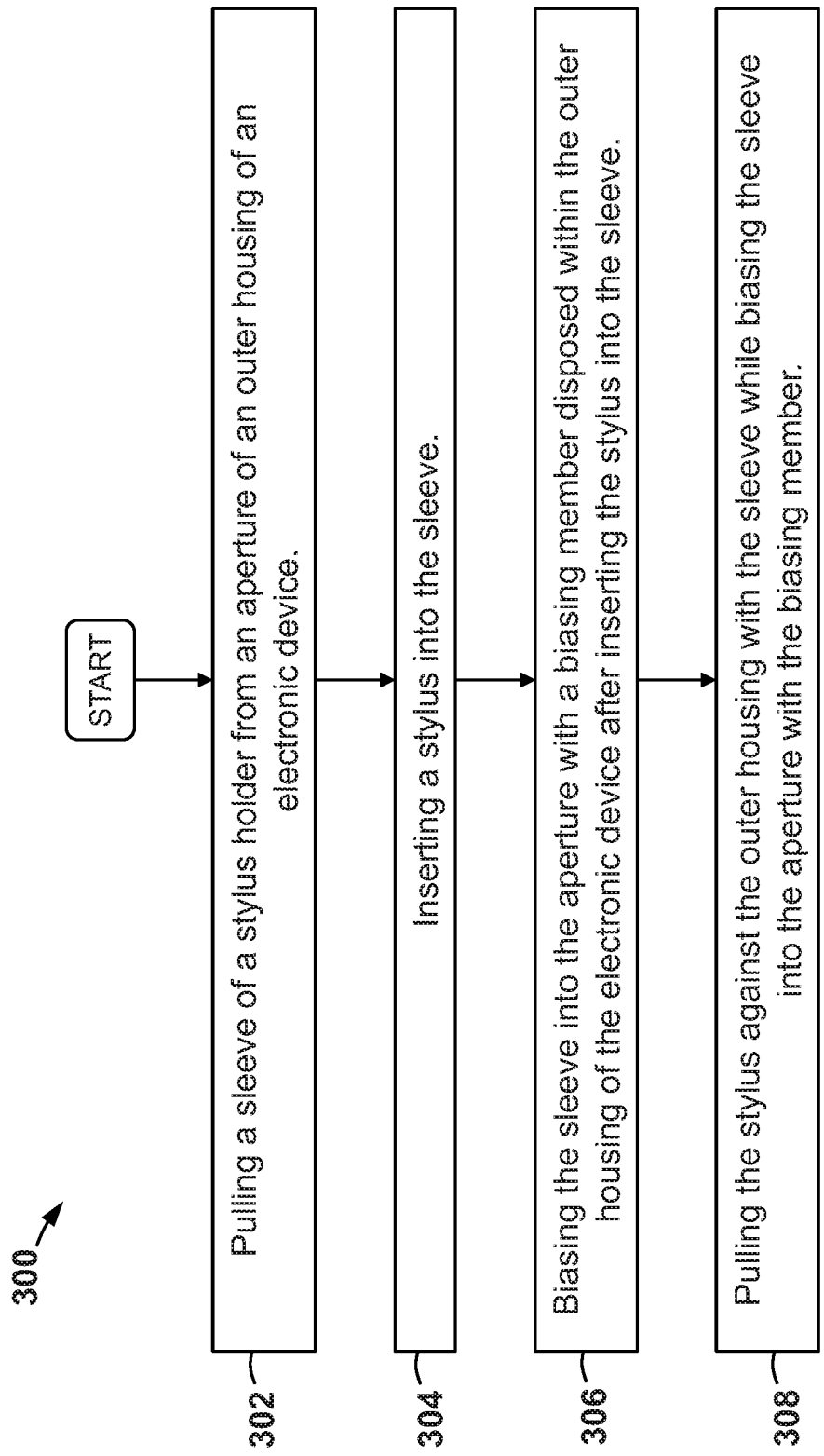
FIG. 9 is a diagram of a method according to some examples.

Referring now to FIG. 9, a method 300 for storing a stylus on an electronic device (e.g., electronic device 10) is shown. In describing the features of method 300 continuing reference is made to FIG. 9; however, at times specific reference is also made to the stylus holders described above (e.g., stylus holders 100, 200, etc.). However, method 300 may be practiced with other devices that are different from the above described stylus holders. Thus, any reference to the previously described stylus holders is merely intended to further describe some examples of method 300.

Initially, method 300 includes pulling a sleeve of a stylus holder from an aperture of an outer housing of an electronic device at 302. For instance, in the example of FIGS. 3 and 5, sleeve 110 of stylus holder 100 may be pulled from aperture 19 in outer surface 17 of the first housing member 14 via engagement member 120. Next, method 300 includes inserting a stylus into the sleeve at 304. As previously described, in the example of FIGS. 3 and 5 once sleeve 110 is extended from aperture 19 in outer surface 19, stylus 50 may be inserted therein (see e.g., FIG. 7). Method 300 also includes biasing the sleeve into the aperture with a biasing member disposed within the outer housing of the electronic device after inserting the stylus into the sleeve at 306, and pulling the stylus against the outer housing with the sleeve while biasing the sleeve into the aperture with the biasing member at 308. As described above for the example of FIG. 7, when sleeve 110 is extended from aperture 19, biasing member 150 (or biasing member 250 for stylus holder 200 shown in FIG. 8) is stretched and therefore exerts biasing force $F_{150}$ on sleeve 110 so as to bias sleeve 110 into aperture 19. As a result, once stylus 50 is inserted within sleeve 110, the biasing force $F_{150}$ (or biasing force $F_{250}$ for stylus holder 200) may cause stylus to be pulled against outer surface 17 of first housing member 14.

Examples disclosed herein have included stylus holders for an electronic device (e.g., stylus holders 100, 200 for electronic device 10) that are to provide a storage location for a stylus. In addition, the example stylus holders disclosed herein may be deployable from an outer surface of the electronic device such that the stylus holders may be partially or wholly retracted into the outer surface of the electronic device when a stylus is not stored therein. Thus, when a stylus is not inserted therein, the example stylus holders may be retracted and therefore hidden so as not to interfere with the operations or aesthetics of the electronic device.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications. While examples described above have included a laptop style electronic device 10 (see e.g., FIGS. 1 and 2), in other examples, the above disclosed stylus holders may be incorporated or used with other types of electronic devices, such as, for instance, tablet computers, smartphones, personal data assistants, desktop computers, computer monitors, televisions, etc.

What is claimed is:

1. An electronic device, comprising:
an outer housing comprising an outer surface comprising a top edge and a bottom edge and an aperture; and
a stylus holder to hold a stylus, the stylus holder coupled to the outer housing; wherein the stylus holder comprises:
   a sleeve that is to transition between:
      an extended position, in which the sleeve is projected out of the aperture of the outer housing; and
      a retracted position, in which the sleeve is retracted into the aperture of the outer housing from the extended position; and
   a biasing member disposed within the outer housing and coupled to the sleeve, wherein the biasing member is to bias the sleeve toward the retracted position when the sleeve is in the extended position, and wherein the biasing member is to secure the stylus against the outer surface by a biasing force such that the stylus is positioned between and spaced apart from the top edge and the bottom edge.

2. The electronic device of claim 1, comprising a stop disposed within the outer housing, wherein the sleeve is disposed about the stop.

3. The electronic device of claim 2, wherein the sleeve is to engage with the stop when the sleeve is in the extended position and in the retracted position.

4. The electronic device of claim 2, comprising a guide, wherein the sleeve is disposed about the guide, and wherein the biasing member is coupled to the guide.

5. The electronic device of claim 1, wherein the biasing member comprises an elastic material.

6. The electronic device of claim 1, wherein the biasing member comprises a coiled spring.

7. The electronic device of claim 1, wherein the outer housing comprises a first housing member pivotably coupled to a second housing member,
   wherein the first housing member includes a keyboard,
   wherein the second housing member includes a display, and
   wherein the aperture is disposed in the first housing member.

8. An electronic device, comprising:
a first housing member;
a second housing member pivotably coupled to the first housing member;
a keyboard mounted within the first housing member comprising an outer surface comprising a top edge and a bottom edge;
a display mounted within the second housing member; and
a stylus holder coupled to the first housing member, wherein the stylus holder comprises:
   a sleeve that is to transition between:
      an extended position, in which the sleeve is projected out of an aperture in the first housing member; and
      a retracted position, in which the sleeve is retracted into the aperture from the extended position; and
   a biasing member disposed within the first housing member and coupled to the sleeve, wherein the biasing member is to stretch and transfer a biasing force to the sleeve when the sleeve is in the extended position, and wherein a stylus disposed in the sleeve is secured against the outer surface by the biasing force such that the stylus is positioned between and spaced apart from the top edge and the bottom edge.

9. The electronic device of claim 8, comprising a stop disposed within the first housing member, wherein the sleeve is disposed about the stop, and wherein the sleeve is to engage with the stop when the sleeve is in the extended position and in the retracted position.

10. The electronic device of claim 9, comprising a guide, wherein the sleeve is disposed about the guide, and wherein the biasing member is coupled to the guide and is to bias the sleeve via the guide.

11. A method, comprising:
pulling a sleeve of a stylus holder from an aperture of an outer housing of an electronic device, wherein the aperture is disposed between a top edge and a bottom edge of an outer surface of the outer housing;
inserting a stylus into the sleeve;
biasing the sleeve into the aperture with a biasing member disposed within the outer housing of the electronic device after inserting the stylus into the sleeve; and
pulling the stylus against the outer housing with the sleeve while biasing the sleeve into the aperture with the biasing member, wherein the biasing member is to secure the stylus against the outer surface by a biasing force such that the stylus is positioned between and spaced apart from the top edge and the bottom edge.

12. The method of claim 11, comprising:
limiting an extension of the sleeve with a stop disposed within the outer housing while pulling the sleeve of the stylus holder from the aperture.

13. The method of claim 12, comprising:
inserting a guide into the sleeve; and
coupling the biasing member to the sleeve via the guide.

14. The method of claim 11, comprising:
removing the stylus from the sleeve; and
retracting the sleeve into the aperture via the biasing member after removing the stylus from the sleeve.

15. The method of claim 11, comprising:
stretching the biasing member while pulling the sleeve of the stylus holder from the aperture.

* * * * *